United States Patent Office 3,117,096
Patented Jan. 7, 1964

3,117,096
REFORMING PROCESS AND CATALYST
THEREFOR
Samuel W. Harris, Chicago, Ill., and John R. Coley, Gary, Ind., assignors to Standard Oil Company, Chicago, Ill., a corporation of Indiana
No Drawing. Filed Aug. 16, 1961, Ser. No. 131,729
2 Claims. (Cl. 252—432)

This application relates to a process of reforming naphthas and a catalytic composition for such process.

The catalytic reforming of hydrocarbons, particularly naphthas, has become of major commercial significance during the past decade. Currently, commercial catalytic reforming capacity is about 2,000,000 barrels per steam day. Most of these commercial units use a platinum-alumina catalyst characterized by comprising a minor proportion, generally less than about 1 weight percent, of platinum supported on an anhydrous alumina base. The total investment in such units is in excess of $500,000,000. Inasmuch as the platinum-alumina catalyst is relatively expensive, being about $10 per pound, inventory value of the commercially used catalyst represents a substantial investment, in excess of $100,000,000.

As is understandable from the exceptionally large investment which has been made in catalytic reformers and the platinum-alumina catalysts used therein, a great deal of research and development effort has been devoted to improving the performance of such catalysts. Any improvement in the performance of such catalysts, even a rather small improvement when considered on a percentage basis, has considerable economic attractiveness on account of the magnitude of commercial operations. However, the intensive and extensive research and development effort devoted to catalytic reforming and the catalysts used therein has greatly reduced the probability of discovering methods of improving the performance of the process and the catalyst.

An important reaction occurring in the reforming of naphtha is the conversion of alkylcyclopentanes to aromatics. Such reaction is more difficult to achieve than is the conversion of cyclohexanes to aromatics, inasmuch as the alkylcyclopentanes appear to be more subject to the undesirable side-reactions of ring opening and hydrocracking. As is well known, alkylcyclopentanes, particularly the methylcyclopentane and the dimethylcyclopentanes, and cyclohexanes comprise a significant fraction of the lower-boiling range portion of naphtha.

It has now been discovered, quite unexpectedly, that by conducting the reforming of a naphtha with a catalyst comprising from about 1 to 20 weight percent of boron nitride and from about 0.1 to 2 weight percent of a platinum-group noble metal supported on a porous inorganic support, preferably predominantly alumina, that the fraction of alkylcyclopentanes converted to aromatics is increased, and the fraction of such naphthenes converted to paraffins, of the same or lower molecular weight, is decreased.

Boron nitride is a white talc-like substance of low bulk density, in the order of 0.1 gram per ml, having desirable lubricating characteristics. It has been characterized as "white graphite" and, as a matter of fact, has an X-ray diffraction pattern very similar to that of graphite. Boron nitride is exceptionally refractory, being stable in either reducing or oxidizing atmospheres at temperatures up to and above 1000° C. Its melting point is about 3000° C. As an illustration of boron nitride's refractory properties, molten iron does not wet its surface, but instead forms a mercury-like droplet when melted in a boron nitride lined crucible. Because of its refractory properties, the promoting or co-catalytic effect of boron nitride when used in a platinum alumina catalyst is an unexpected discovery.

Preparation of the noble metal-containing catalysts is the subject of extensive recently published technology. Broadly speaking, such catalysts comprise a minor amount, usually less than 2 weight percent, of a noble metal which is preferably platinum supported on a porous inorganic oxide. Alumina and mixtures of silica and alumina are preferred supports. Halogens, particularly fluorine or chlorine, are often incorporated into the catalyst in an amount which may be less than, equal to or greater than the weight fraction of the noble metal. In addition, small amounts of inorganic oxides other than silica or alumina may be incorporated with the catalyst; illustrative examples of such inorganic oxides are titania, zirconia, boria and oxides of other metals having a valence of at least +3. However, the amount of metal contained in such additional inorganic oxides other than alumina or silica is generally and preferably less than the noble metal content of the catalyst. The naphtha reforming process utilizes the catalyst of the foregoing type, in which has been incorporated from about 1 to 20 weight percent of boron nitride.

The alumina for use as a support of the boron nitride-noble metal containing catalyst may be prepared by a variety of procedures. Such alumina may be prepared by hydrolyzing an aluminum alcoholate which was prepared for instance according to the disclosure of U.S. Patent No. 2,636,865. Alternatively, such an alumina may be prepared by precipitating a hydrous alumina from an aqueous solution of an alumina salt, particularly aluminum trichloride. A preferred alumina preparation procedure is that of dissolving metallic aluminum in weakly acidified water, preferably acidified with an organic acid such as acetic acid, in the presence of mercury or a compound thereof, and thereafter gelling the aluminum sol thus formed. The hydrous alumina prepared by any of the foregoing procedures is subsequently dried and calcined at least once prior to the completion of the manufacture of the catalytic composite. Calcination temperatures may range from 600 to 1200° F., advantageously about 900–1000° F., and in any event below the temperatures at which various species of anhydrous alumina are transferred into corundum (alpha-alumina). The preferred species of anhydrous alumina for use in a boron nitride and noble metal-containing catalyst are eta- and gamma-alumina, or mixtures thereof.

The noble metal used in these catalysts may be selected from the platinum-group comprising platinum, palladium, iridium, osmium, rhodium and ruthenium, or mixtures thereof, preferably platinum. When platinum is used, a preferred source is an aqueous solution of chloroplatinic acid. Another advantageous form of platinum is an aqueous solution of ammonium polysulfide and chloroplatinic acid. Platinum may also be added in the form of other platinum-halogen containing compounds or as a platinum-amine complex. Comparable compounds containing noble metals other than platinum may be used when desired.

The addition of the noble metal into the support may be done at a variety of points in the preparation of such support. For instance, a mixture of ammonium polysulfide and chloroplatinic acid may be added to an alumina sol prior to the gelling and subsequent calcination of such sol. In another method, the noble metal-containing compound may be added to precipitated hydrous alumina prior to drying and calcining such alumina. The noble metal compound also may be added by impregnation to the calcined alumina, preferably after the alumina has been formed into the desired shape of the final catalyst. More than one means of adding platinum may be used during the preparation of any particular batch of catalyst, e.g., a platinum-containing alumina sol may be gelled, the alumina calcined and shaped into a desired form and thereafter impregnated with an additional amount of platinum or other noble metal. A halogen in excess of any halogen which may be in a noble metal-containing compound may be added either before, during or after the addition of the noble metal.

Specific illustrative examples of catalyst preparation techniques are disclosed in U.S. Patent No. 2,479,109, U.S. Patent No. 2,589,189, and, particularly, U.S. Patents No. 2,659,701, 2,849,514, and 2,911,375.

In making a catalytic composition comprising boron nitride and a noble metal on a porous inorganic oxide support such as alumina, the boron nitride may be added to dried alumina either before or after the addition of the noble metal, and before the alumina is calcined. Alternatively, the boron nitride may be added to previously calcined alumina to which the noble metal compound may or may not have already been added. In either of the foregoing methods, the boron nitride powder is physcially admixed with ground alumina, and subsequently shaped and calcined. As a result of its low bulk density, the boron nitride also may be added to a liquid solution or sol when the support is made by precipitation from an aluminum salt solution or by gelling an alumina sol. Sufficient boron nitride is added to comprise from about 1 to 20 weight percent of the finished catalyst, preferably from about 3 to 10 percent. An excessive amount of boron nitride, above about 20% tends to reduce unduly the primary activity of the catalyst and is, therefore, undesirable.

Because of its refractory properties, the inclusion of boron nitride in a catalytic composition herein described does not increase the composition's susceptibility to poisons or temperature. However, it is advantageous to minimize contact at high temperatures, about 1000° F. or higher, of the catalytic composition with water vapor. This is because of the tendency of boron nitride to hydrolyze to ammonia and boric acid.

The reforming of petroleum naphtha to the catalyst herein described is advantageously done in a plurality of serially connected fixed catalyst bed reactors, although it may be done in a fluidized catalyst bed reactor. Suitable reforming conditions include temperatures in the range of about 800 to 1050° F., advantageously within the range of 900 to 1000° F. and using a lower reactor inlet temperature on the lead reactor than on the subsequent reactors. Suitable reforming pressures include the range of about 100 to 1000 pounds per square inch guage, preferably less than 750 p.s.i.g., and advantageously 200 to 400 p.s.i.g. Hourly weight space velocities in the range of about 0.1 to 10, advantageously 1 to 2.5, may be used. The space velocity selected is preferably correlated with the desired octane of the product reformate, using decreasing space velocities as the desired octane of the reformate is increased. Hydrogen, generally in the form of hydrogen-rich recycle gas, is charged to the reactors with the naphtha in the range of about 1000 to 10,000 standard cubic feet per barrel of naphtha charge, preferably using about 2000 to 6000 standard cubic feet per barrel of charge. The boron nitride catalytic composition herein described may be used in a high pressure non-regenerative system of hydroforming as exemplified by disclosure of U.S. Patent No. 2,479,110, or in a lower pressure regenerative system exemplified by disclosures of U.S. Patent No. 2,773,014, and U.S. Patent No. 2,952,611, Petroleum Engineer, volume 26, April, 1954, at page C-35.

To highlight the effectiveness of the invention, methylcyclopentane was reformed using a catalyst comprising about 0.6 weight percent platinum and about 4.6 weight percent boron nitride. For comparison purposes, the same feed was reformed over a reference catalyst which comprised 0.58 weight percent chlorine and 0.6 weight percent platinum supported on alumina. The catalyst was obtained commercially and is understood to have been prepared by adding chloroplatinic acid to an alumina sol, gelling the sol and thereafter drying and calcining. The sol is understood to have been made by dissolving metallic aluminum with a dilute aqueous acetic acid in the presence of mercuric oxide. The reference catalyst is hereinafter designated as catalyst R.

A batch of boron nitride-containing catalyst was prepared from the reference catalyst. To do this, 155.7 grams of catalyst R was ground up and physically admixed with 7.5 grams of powdered boron nitride. The mixture was then pelleted into pellets and calcined. The catalyst so made is hereinafter designated catalyst A, with number suffixes indicating individual aliquots thereof.

Four runs were made with three aliquots of catalyst A, and two reference runs were made using catalyst R. The charge for these runs was commercially obtained methylcyclopentane having a purity of 99%. In order to reduce the sulfur content of the charge methylcyclopentane, it was hydrofined over an 0.6% platinum-on-alumina catalyst at 200 p.s.i.g., and a hydrogen:charge ratio of approximately 1. One hydrofining run used a liquid space velocity of 6 and a temperature of 625° F. A second hydrofining run used a space velocity of 4.8 and a temperature of 640° F. The hydrofined methylcyclopentane was washed with aqueous sodium hydroxide solution, then washed with water and dried over-night in contact with sodium.

The reactor used for both the hydrofining and all reforming runs was a steel pipe having an inside diameter of 0.83 inch and a length of about 40 inches. The reactor was electrically heated to the desired temperature. Temperature measurement was made by an axially aligned thermocouple. The methylcyclopentane was charged to the reactor by a positive displacement pump. Bottled hydrogen was used. The effluent from the reactor during the reforming runs was cooled and the gaseous and liquid phases analyzed.

The table which follows summarizes the results of the various runs and highlights the advantages of using boron nitride in a catalyst to promote the conversion of an alkylcyclopentane to an aromatic while minimizing conversion of such cyclopentane to undesirable paraffins. Runs 1 and 2 were done with separate aliquots of catalyst A, using in each instance 19.1 grams of catalyst A. Runs 3 and 4 were done (for reference purposes) using separate 18.2 gram aliquots of catalyst R. It is to be noted that the 18.2 grams of catalyst R is equivalent in platinum and chlorine content to the content thereof in the 19.1 grams of catalyst A used in runs 1 and 2. Runs 5 and 6 used a third 19.1 gram aliquot of catalyst A. Between runs 5 and 6, the catalyst was regenerated by burning coke therefrom. The regeneration was conducted using air at atmospheric pressure and limiting the catalyst bed flame front temperature to not more than 1000° F. In the analysis of the reforming products, the amount of coke was determined by analyzing the carbon oxide content of combustion gases resulting from burning coke from the catalyst at the termination of the run. The hydrogen production was calculated based upon the conversion of methylcyclopentane to other hydrocarbons according to the analysis of the products. The temperature listed for each run are averages during the run, although the measured temperature taken at ½ hour intervals fluctuated slightly. For instance, during run 1, the measured temperature varied between 889° F. and 898° F.

Table I

| Run No | 1 | 2 | 3 | 4 | 5 | 6 |
|---|---|---|---|---|---|---|
| Catalyst | A-1 | A-2 | R | R | A-3 | A-3 |
| Conditions: | | | | | | |
| Temp., °F | 895 | 900 | 890 | 910 | 900 | 905 |
| Press., p.s.i.g | 197 | 206 | 205 | 205 | 198 | 200 |
| LHSV | 2 | 2 | 2 | 2 | 2 | 2 |
| $H_2$/Feed Mol Ratio | 4 | 5.3 | 5.6 | 4.9 | 4.6 | 4.5 |
| Total charge, g | 340 | 340 | 342 | 340 | 340 | 341 |
| Products, wt. percent: | | | | | | |
| $H_2$ | 3.4 | 2.5 | 1.7 | 1.5 | 2.1 | 2.0 |
| Coke | 0.08 | 0.05 | 0.01 | 0.01 | 0.03 | 0.03 |
| $C_1$-$C_4$ | 0.7 | 1.2 | 1.8 | 5.6 | 2.5 | 2.6 |
| $C_5$+ | 95.9 | 96.2 | 94.9 | 89.3 | 91.8 | 91.9 |
| Analysis of $C_5$+ Fraction: | | | | | | |
| $C_5$ Paraffins | 0.2 | 0.4 | 0.5 | 1.9 | 0.7 | 0.6 |
| $C_6$ Paraffins | 4.7 | 12.9 | 18.8 | 42.5 | 31.3 | 32.5 |
| Dimethyl cyclopentane | 1.1 | 1.8 | 1.1 |  | 0.5 | 0.5 |
| Cyclopentane | 0.2 | 0.4 | 0.6 | 1.2 | 0.8 | 0.6 |
| Cyclohexane | 0.8 | 3.0 | 0.5 |  | 0.3 | 0.4 |
| Methyl cyclopentane | 44.7 | 42.3 | 48.9 | 13.3 | 24.2 | 24.1 |
| Benzene | 48.1 | 38.8 | 29.4 | 40.8 | 41.6 | 40.8 |
| Benzene, as percent of Charge Converted | 87.0 | 67.2 | 57.5 | 47.1 | 55.0 | 53.8 |

The production of benzene, as percent of the methylcyclopentane converted, illustrates the unexpected increase in conversion to aromatics, and accompanying decrease in conversion to undesirable paraffins, obtained by reforming with a boron nitride-containing catalyst. A comparison of runs 2 and 3 shows that benzene production was increased more than 16%, other conditions being otherwise substantially the same. A similar increase is noted upon comparison of runs 4 and 5 or 6.

Having thus described the invention, what is claimed is:

1. A catalytic composition comprising from about 1 to 20 weight percent boron nitride and about 0.1 to 2 weight percent of a platinum-group noble metal supported on alumina.

2. A composition of claim 1 which comprises about 5 weight percent boron nitride.

References Cited in the file of this patent

UNITED STATES PATENTS

| | | |
|---|---|---|
| 2,487,916 | Haensel et al. | Aug. 16, 1949 |
| 2,751,333 | Heinemann | June 19, 1956 |
| 2,952,721 | Thomas et al. | Sept. 13, 1960 |